(12) United States Patent
Gruden

(10) Patent No.: US 6,676,564 B2
(45) Date of Patent: Jan. 13, 2004

(54) BRAKE-SHIFT LEVER INTERLOCK UNIT

(75) Inventor: James M. Gruden, Centerville, OH (US)

(73) Assignee: SAIA-Burgess Inc., Vandalia, OH (US)

( * ) Notice: Subject to any disclaimer, the term of this patent is extended or adjusted under 35 U.S.C. 154(b) by 0 days.

(21) Appl. No.: 10/052,615

(22) Filed: Jan. 18, 2002

(65) Prior Publication Data

US 2003/0139253 A1 Jul. 24, 2003

(51) Int. Cl.[7] .......................... B60K 41/20; H01F 3/00
(52) U.S. Cl. .................................... 477/96; 335/257
(58) Field of Search .......................... 477/96; 70/247, 70/248, 252, 254, 277; 180/271; 251/129.15; 335/256, 257, 266–268

(56) References Cited

U.S. PATENT DOCUMENTS

| | | |
|---|---|---|
| 4,812,884 A | 3/1989 | Mohler |
| 4,887,702 A | 12/1989 | Ratke et al. |
| 5,018,610 A | 5/1991 | Rolinski et al. |
| 5,027,929 A | 7/1991 | Ratke et al. |
| 5,076,114 A | 12/1991 | Moody |
| 5,176,231 A | 1/1993 | Moody et al. |
| 5,251,723 A | 10/1993 | Rolinski et al. |
| 5,379,871 A * | 1/1995 | Asano et al. ......... 74/483 R X |
| 5,489,246 A | 2/1996 | Moody et al. |
| 5,562,568 A * | 10/1996 | Smale ...................... 477/96 X |
| 5,647,818 A | 7/1997 | Moody |
| 5,718,312 A | 2/1998 | Osborn et al. |
| 5,862,899 A * | 1/1999 | Dahlstrom ................ 477/96 X |
| 5,902,209 A | 5/1999 | Moody |
| 5,918,646 A * | 7/1999 | Covelli .................. 335/257 X |
| 5,938,562 A | 8/1999 | Withey |

FOREIGN PATENT DOCUMENTS

| | | | |
|---|---|---|---|
| EP | 625656 | * | 11/1994 |
| EP | 0987473 | | 3/2000 |

* cited by examiner

Primary Examiner—Roger Pang
(74) Attorney, Agent, or Firm—Tarolli, Sundheim, Covell & Tummino L.L.P.

(57) ABSTRACT

A brake-shift interlock unit includes a pair of coils which are disposed in a coaxial relationship. A plunger is movable in a passage which extends through the coils. Upon actuation of a vehicle ignition switch, while a brake switch remains in an unactuated condition, a plunger pull coil is energized to move the plunger from the extended position to the partially retracted position. At this time, the plunger engages a stop member. Upon actuation of the vehicle brake, a stopper hold coil is de-energized to enable a shift lever to move.

55 Claims, 3 Drawing Sheets

BRAKE-SHIFT LEVER INTERLOCK UNIT

BACKGROUND OF THE INVENTION

The present invention relates to an apparatus which prevents movement of a vehicle shift lever out of a park position prior to actuation of both a vehicle ignition switch and a vehicle brake switch.

In order to prevent inadvertent movement of a shift lever for an automatic transmission of a vehicle out of a park position into a reverse or drive position during starting of a vehicle, it is common to provide the vehicle shift lever with a manually actuatable interlock button. When the vehicle ignition switch has been actuated and the vehicle brake is depressed, manually depressing of the interlock button enables the vehicle shift lever to be moved out of park position. Brake-shift lever interlocks are disclosed in U.S. Pat. Nos. 5,076,114; 5,176,231; 5,489,246; and 5,647,818 and Published European Patent Application No. EP 0 987 473 A2.

SUMMARY OF THE INVENTION

The present invention relates to a new and improved apparatus which prevents movement of a vehicle shift lever out of a park position prior to activation of both a vehicle ignition switch and a vehicle brake switch. The apparatus includes first and second coils which are connected with a base. The coils may, advantageously, define a passage which extends through the coils. A plunger may be movable along the passage through the coils.

When a vehicle ignition switch is in an actuated condition and a vehicle brake switch is in an unactuated condition, the plunger may be moved from an extended position to a partially retracted position under the influence of a magnetic field provided by the first coil. At this time, an end portion of the plunger may block movement of a force transmitting member connected with the vehicle shift lever to prevent movement of the vehicle shift lever out of a park position.

Upon depressing of a vehicle brake pedal, a brake switch is actuated. The plunger may then be released for movement from the partially retracted position to a fully retracted position. As this occurs, force applied against the plunger by the force transmitting member may move the plunger to a fully retracted position. The vehicle shift lever can then be moved from the park position.

In a particularly advantageous one of many possible embodiments of the invention, the plunger has a side portion which extends along the path of movement of the plunger between the extended and fully retracted positions. When the plunger of this particular embodiment of the invention is in the extended position, the side portion is engaged by and blocks movement of the force transmitting member. When the plunger is moved to a partially retracted position under the influence of the magnetic field from the first coil, a cam surface on an end portion of the plunger is engaged by the force transmitting member and blocks movement of the force transmitting member to prevent movement of the shift lever from the park position. When the vehicle brake switch is actuated, the plunger is released and force applied against the cam surface on the plunger by the force transmitting member is effective to move the plunger to a fully retracted position enabling the shift lever to be moved out of the park position.

A stop member may be provided, in the foregoing specific one of many possible embodiments of the inventions, to block movement of the plunger from the partially retracted position to the fully retracted position under the influence of force applied against the cam surface by the force transmitting member when the vehicle brake switch is in the unactuated condition. Upon operation of the vehicle brake switch to the actuated condition, the second coil is de-energized. De-energization of the second coil releases the stop member and enables the plunger to be moved from the partially retracted position to the fully retracted position.

BRIEF DESCRIPTION OF THE DRAWINGS

The foregoing and other features of the present invention will become apparent to one skilled in the art to which the present invention relates upon consideration of the following description of the invention with reference to the accompanying drawings wherein.

DESCRIPTION OF SPECIFIC PREFERRED EMBODIMENTS OF THE INVENTION

General Description

Figure 1:
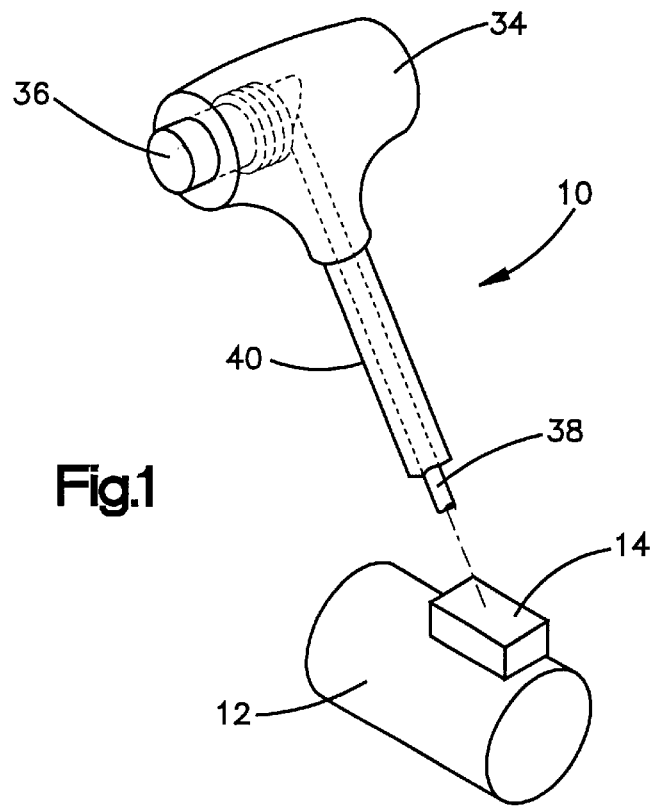
FIG. 1 is a schematic illustration depicting the relationship between a vehicle shift lever, a brake shift interlock unit, and an automatic transmission for the vehicle.

A shift lever 10 for controlling operation of an automatic transmission 12 in a vehicle is illustrated schematically in FIG. 1. A brake-shift lever interlock unit 14, constructed in accordance with the present invention, is provided to prevent movement of the shift lever 10 out of a park position prior to actuation of both a vehicle ignition switch 18 (FIG. 2) and a vehicle brake switch 20. The vehicle ignition switch 18 and brake switch 20 are connected with a plunger pull coil 24 and a stopper hold coil 26 by electrical circuitry 30.

The shift lever 10 (FIG. 1) includes a manually engageable handle 34. A manually actuatable interlock button 36 is provided on the handle 34. An actuator rod 38 extends along and is axially movable in a hollow shaft 40 of the shift lever 10 in response to actuation of the pushbutton 36.

The actuator rod 38 may be connected directly with the brake-shift lever interlock unit 14 or may be connected with the interlock unit through a suitable linkage. The linkage may include a bell crank or other force transmitting member. Alternatively, the actuator rod 38 may be connected with the brake-shift lever interlock unit 14 by electrical circuitry. This circuitry may include a solenoid which is effective to move a force transmitting member in the brake-shift lever interlock unit 14. It is contemplated that the shift lever 10 and brake-shift lever interlock unit 14 may be interconnected in any one of many known ways to effect movement of a force transmitting member in the interlock unit in response to manual actuation of the pushbutton 36.

Figure 2:
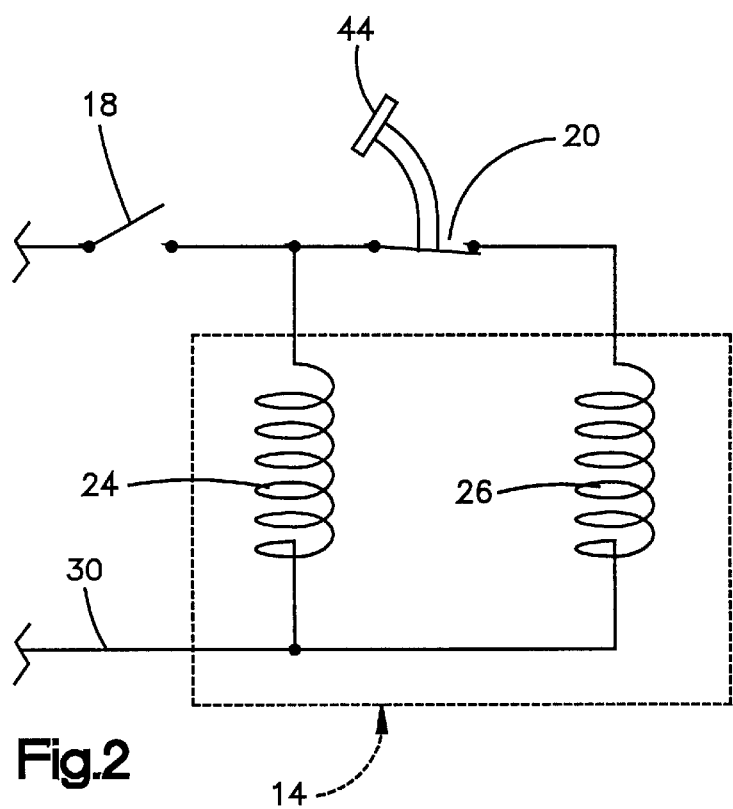
FIG. 2 is a schematic illustration of the relationship between a pair of coils in the brake-shift lever interlock unit of FIG. 1, a vehicle ignition switch, and a vehicle brake switch.

Prior to starting of a vehicle containing the automatic transmission 12, the ignition switch 18 and brake switch 20 are in the unactuated conditions illustrated in FIG. 2. At this time, the brake-shift lever interlock unit 14 is effective to prevent movement of the shift lever 10 out of its parked position even if the interlock button 36 on the handle 34 is manually depressed. Therefore, prior to actuation of the ignition switch 18, it is impossible to move the shift lever 10 out of the park position.

When the vehicle engine is to be started, the normally open ignition switch 18 is closed. Closing of the ignition switch 18 effects energization of the plunger pull coil 24 and stopper hold coil 26 in the brake-shift lever interlock unit 14. At this time, the brake-shift lever interlock unit 14 is still effective to prevent movement of the shift lever 10 from the park position. Thus, as long as the brake switch 20 is in an unactuated condition, that is, the closed condition of FIG. 2, the brake-shift lever interlock unit 14 is effective to prevent movement of the shift lever 10 from the park position even if the manual interlock button 36 is depressed.

When an operator of the vehicle depresses a brake pedal 44 (FIG. 2), the vehicle brakes are actuated. At the same time, the brake switch 20 is operated to its unactuated condition. Since the vehicle ignition switch 18 is in its actuated condition, that is, closed, the plunger pull coil 24 in the brake-shift lever interlock unit 14 is energized while the stopper hold coil 26 is de-energized. Upon de-energization of the stopper hold coil 26, the brake-shift lever interlock unit 14 enables the shift lever 10 to be moved from its park position in response to manual actuation of the pushbutton 36 and the application of force to the handle 34.

Brake-Shift Lever Interlock Unit

Figure 3:
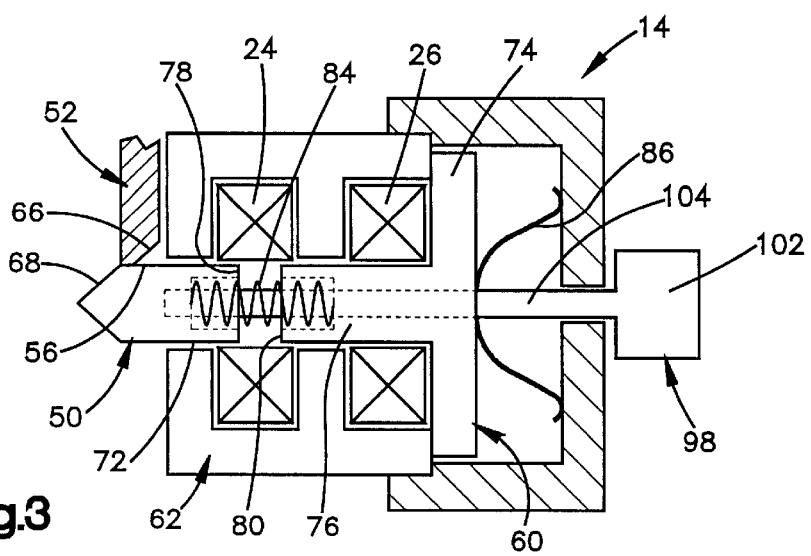
FIG. 3 is a schematic illustration depicting the construction of the brake-shift lever interlock unit of FIG. 1 and illustrating the relationship of a plunger to the coils in the circuitry of FIG. 2 when the plunger is in an extended position.
Figure 4:
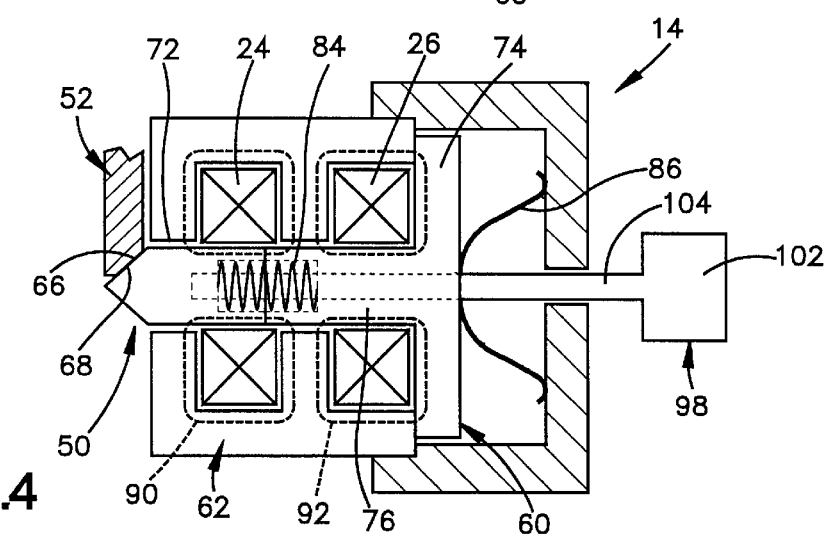
FIG. 4 is a schematic illustration, generally similar to FIG. 3, illustrating the plunger in a partially retracted position when the vehicle ignition switch of FIG. 2 is in an actuated condition and the vehicle brake switch is in an unactuated condition.
Figure 5:
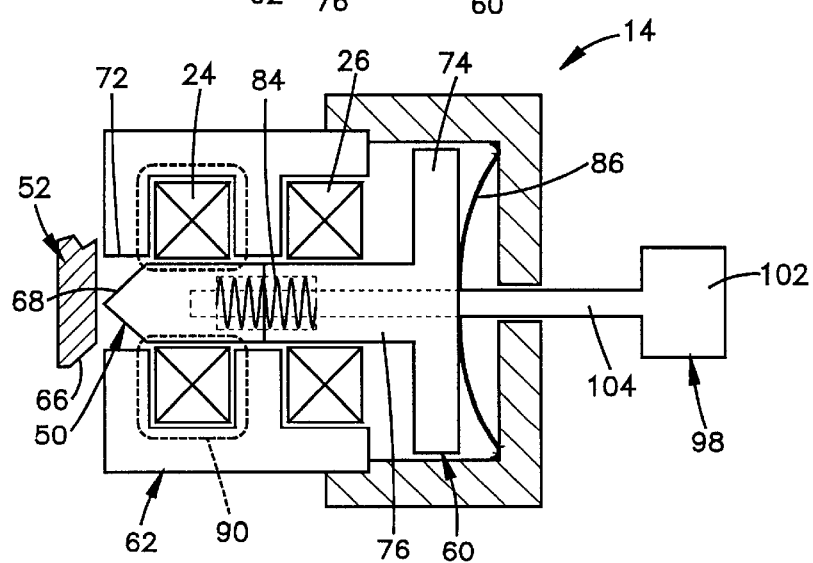
FIG. 5 is a schematic illustration, generally similar to FIGS. 3 and 4, illustrating the plunger in a fully retracted position when both the vehicle ignition switch and brake switch are in an actuated condition.

The brake-shift lever interlock unit 14 is illustrated schematically in FIGS. 3–5. Prior to operation of the vehicle ignition switch 18 from the unactuated (open) condition of FIG. 2 to an actuated (closed) condition, the brake-shift lever interlock unit 14 is in the initial condition illustrated schematically in FIG. 3. At this time, a cylindrical plunger 50 is in an extended position blocking movement of a force transmitting member 52 connected with the actuator rod 38.

When the plunger 50 is in the extended position illustrated in FIG. 3, a cylindrical side surface 56 on the plunger 50 is engaged by the force transmitting member 52. This blocks downward (as viewed in FIG. 3) movement of the force transmitting member 52 and thereby prevents movement of the shift lever 10 from its park position. Therefore, prior to actuation of the ignition switch 18, the brake-shift lever interlock unit 14 is effective to prevent movement of the shift lever 10 out of its park position.

Upon actuation of the ignition switch 18 to the closed condition, the plunger pull coil 24 is energized. Energization of the plunger pull coil 24 effects movement of the plunger 50 from the extended position of FIG. 3 to the partially retracted position of FIG. 4. Actuation of the ignition switch 18 to its closed condition also effects energization of the stopper hold coil 26 through the normally closed brake switch 20. Energization of the stopper hold coil 26 retains a stop member or movable armature section 60 against movement relative to a cylindrical base or stationary armature section 62.

When the plunger 50 is in the partially retracted position of FIG. 4, the plunger is held against further inward, that is rightward as viewed in FIG. 4, movement by the stop member 60. At this time, a cam surface 66 on the force transmitting member 52 engages a cam surface 68 on the plunger 50. Force applied against the cam surface 68 on the plunger 50 by the force transmitting member 52 presses the plunger against the stop member 60. The energized stopper hold coil 26 is effective to hold the stop member 60 against movement relative to the base 62. Therefore, the force transmitting member 52 can not move the plunger 50 while the stopper hold coil 26 is energized and the brake switch 20 (FIG. 2) is in its unactuated condition.

Upon depression of the brake pedal 44 (FIG. 2), the brake switch 20 is operated from its unactuated (closed) condition to its actuated (open) condition. This results in the stopper hold coil 26 becoming de-energized. De-energization of the stopper hold coil 26 enables both the plunger 50 (FIG. 4) and the stop member 60 to move relative to the base 62. The plunger 50 and stop member 60 move as a unit under the influence of force applied against the cam surface 68 on the plunger by the cam surface 66 on the force transmitting member 52.

As this occurs, the plunger 50 moves from the partially retracted position of FIG. 4 to the fully retracted position of FIG. 5. The stop member 60 moves with the plunger 50. The force transmitting member 52 can then move downward (as viewed in FIG. 5) past the plunger 50. This releases the shift lever 10 (FIG. 1) for movement from the park position to a position selected by the driver of the vehicle when the pushbutton 36 is manually depressed.

The cylindrical side surface 56 on the plunger 50 extends parallel to the path of movement of the plunger between the extended position of FIG. 3 and the fully retracted position of FIG. 5. Therefore, the application of force against the side surface 56 on the extended plunger 50 (FIG. 3) by the force transmitting member 52 is ineffective to cause movement of the plunger from the extended position. The cam surface 68 on the plunger 50 has a conical configuration and extends at an acute angle to the path of movement of the plunger between the extended and fully retracted positions. The cam surface 66 on the force transmitting member 52 has a flat rectangular configuration and extends at an acute angle to the path of movement of the plunger 50 between the extended and fully retracted positions. Therefore, when the cam surface 66 on the force transmitting member 52 is pressed against the cam surface 68 on the plunger 50 while the plunger is in the partially retracted position of FIG. 4 with the stopper hold coil 26 de-energized, the plunger 50 is moved to the fully retracted position of FIG. 5 with the stop member 60.

The coaxial plunger pull coil 24 and the stopper hold coil 26 have annular configurations. The annular plunger pull coil 24 is coaxial with and is axially offset from the annular stopper hold coil 26. The coils 24 and 26 cooperate with the base 62 to form a cylindrical passage 72.

The passage 72 has a central axis which is coincident with central axes of the plunger pull coil 24 and stopper hold coil 26. The plunger 50 is movable axially along the passage 72 from the extended position of FIG. 3 to through the partially retracted position of FIG. 4 to the fully retracted position of FIG. 5. The longitudinally extending central axis of the plunger 50 is coincident with the longitudinal central axis of the passage 72 and the central axes of the plunger pull coil 24 and stopper hold coil 26.

The stop member 60 has a circular head portion 74 and a cylindrical stem portion 76. The stop member 60 has a central axis which is coincident with the central axis of the passage 72. When the plunger 50 is in the extended position of FIG. 3, a circular end surface 78 on the plunger 50 is axially spaced from a circular end surface 80 on the stem portion 76 of the stop member 60. When the plunger 50 is in the partially retracted position of FIG. 4 and the fully retracted position of FIG. 5, the end surface 78 on the plunger 50 is engagement with the end surface 80 on the stem portion 76 of the stop member 60.

When the ignition switch 18 is in the unactuated condition of FIG. 2, the coaxial coils 24 and 26 are both de-energized. At this time, a biasing spring 84 urges the plunger 50 to the fully extended position of FIG. 3. The biasing spring 84 has a helical configuration and is disposed in a coaxial relationship with the plunger 50 and the passage 72. A stopper biasing spring 86 presses the head portion 74 of the stop member 60 against the base 62. The stopper biasing spring 86 is stronger than the plunger biasing spring 84 and is effective to cause a slight compression of the plunger biasing spring between the stem portion 76 of the stop member 60 and the plunger 50.

Upon actuation of the ignition switch 18, both the plunger pull coil 24 and the stopper hold coil 26 are energized. Energization of the plunger pull coil 24 causes a magnetic field, indicated in dashed lines at 90 to emanate from the plunger pull coil. Similarly, a magnetic field 92 emanates from the stopper hold coil 26.

The magnetic field 90 from the plunger pull coil 24 is effective to pull the plunger 50 rightward (as viewed in FIGS. 3 and 4) from the extended position to the partially retracted position. As this occurs, the plunger biasing spring 84 is compressed between the plunger 50 and stop member 60. Movement of the plunger 50 from the partially retracted position of FIG. 4 is blocked by engagement of the stem portion 76 of the stop member 60 with the plunger.

The magnetic field 92 from the stopper hold coil 26 is effective to pull the head portion 74 of the stop member 60 toward the left (as viewed in FIGS. 3 and 4). This results in the head portion 74 of the stop member 60 being firmly pressed against the stationary base 62.

At this time, the cam surface 56 on the force transmitting member 52 engages the cam surface 68 on the plunger 50. Therefore, downward (as viewed in FIG. 4) force applied against the plunger 50 by the force transmitting member 52 urges the plunger toward the right (as viewed in FIG. 4). At this time, the magnetic field 92 from the stopper hold coil 26 and the biasing spring 86 are effective to hold the stop member 60 against movement under the influence of any force which can be applied against the plunger 50 by the force transmitting member 52. Therefore, the force transmitting member 52 is blocked and the force transmitting member is effective to prevent movement of the shift lever 10 from the parked position.

Upon actuation of the brake pedal 44 (FIG. 2), the brake switch 20 is actuated to an open condition. Opening the brake switch 20 is effective to de-energize the stopper hold coil 26. Upon de-energization of the stopper hold coil 26, the magnetic field 92 is eliminated and the stop member 60 is free to move towards the right (as viewed in FIG. 4) against the influence of the biasing spring 86. Therefore, force transmitted from the force transmitting member 52 is effective to move both the plunger 50 and the stop member 60 toward the right. Thus, force applied by the cam surface 66 on the force transmitting member 52 against the cam surface 68 on the plunger 50 is effective to force the plunger 50 toward the right (as viewed in FIG. 4) from the partially retracted position to the fully retracted position of FIG. 5.

When the plunger 50 is in the fully retracted position, the plunger may be disposed completely within the base 62, in the manner illustrated schematically in FIG. 5, or project outward from the base. However, the force transmitting member 52 will be movable downward past the plunger 50, in the manner illustrated schematically in FIG. 5. Downward movement of the force transmitting member 52 enables the shift lever 10 to be moved from the parked position.

As the plunger 50 is moved from the partially retracted position of FIG. 4 to the fully retracted position of FIG. 5, the end surface 78 on the plunger is pressed against the end surface 80 on the stop member 60. Force is transmitted from the plunger 50 to the stop member 60 to move the stop member against the influence of the biasing spring 86. This results in the plunger 50 and stop member 60 being moved together toward the right (as viewed in FIG. 5) from the partially retracted position of the plunger to the fully retracted position of the plunger. During this rightward movement of the plunger 50 and stop member 60, the biasing spring 84 remains compressed between the plunger and the stop member and moves with the plunger and stop member.

During subsequent operation of the vehicle, the brake pedal 44 will be released. This will result in the brake switch 20 closing and the stopper hold coil 26 again being energized. However, at this time, the shift lever 10 will be in a position other than its park position and the force transmitting member 52 will be in the path of movement of the plunger 50 from its retracted position (FIG. 5) to its partially extended position. Therefore, the force transmitting member 52 will be effective to block movement of the plunger 50 from the fully retracted position even though the stopper member holding coil 26 is again energized. This results in the stopper member 60 remaining in the retracted position shown in FIG. 5 during operation of the vehicle.

When operation of the vehicle is to be interrupted, the vehicle is moved to a parking location and the brake pedal 44 again depressed. Depressing the brake pedal 44 actuates the brake switch 20 to de-energize the stopper hold coil. At this time, the force transmitting member 52 still blocks movement of the plunger 50 from the retracted position of FIG. 5 to the partially retracted position of FIG. 4.

When the interlock button 36 on the handle 34 (FIG. 1) is again depressed and the shift lever moved to the park position, the force transmitting member is moved upward from the position shown in FIG. 5 through the position shown in FIG. 4 to the position shown in FIG. 3. As this occurs, the biasing spring 86 is effective to urge both the stop member 60 and the plunger 50 from the fully retracted position of FIG. 5 to the partially retracted position of FIG. 4. When the plunger 50 has moved to the partially retracted position of FIG. 4, the biasing spring 86 is no longer effective to urge the plunger toward the left. At this time, the ignition switch 18 is still in an actuated condition and the magnetic field 90 from the plunger pull coil 24 is effective to hold the plunger 50 in the partially retracted position illustrated in FIG. 4 even though the force transmitting member 52 has moved back to the raised position shown in FIG. 3.

When the ignition switch 18 is returned to the unactuated condition illustrated in FIG. 2, the plunger pull coil 24 is de-energized. When this occurs, the biasing spring 84 is effective to move the plunger toward the left (as viewed in FIG. 4) from the partially retracted position to the extended position of FIG. 3. Of course, once the plunger 50 has moved to the extended position of FIG. 3, the plunger blocks movement of the force transmitting member 52 so that the shift lever 10 can not be moved out of the park position.

In the very unlikely event that there is a malfunctioning of the brake-shift lever interlock unit 14, a manually engageable release member 98 can be pulled from the position illustrated in FIG. 3 through the position illustrated in FIG. 4 to the position illustrated in FIG. 5 to release the shift lever 10 for movement from the park position. The manually engageable release member 98 includes a handle 102 which is connected with the plunger 50 by a cylindrical stem 104.

When the shift lever 10 is to be manually released for movement from the park position, the handle portion 102 of the manual release member 98 is grasped and pulled toward the right (as viewed in FIG. 3). This force pulls the plunger rightward from the extended position of FIG. 3 to the partially retracted position of FIG. 4. During this movement of the plunger 50, the relatively strong biasing spring 86 is effective to hold the right portion 74 of the stop member 60 against the stationary base 62. Therefore, the relatively weak biasing spring 84 is compressed between the stop member 60 and plunger 50 in the manner illustrated in FIG. 4.

Continued rightward (as viewed in FIG. 4) pulling on the handle 102 of the manual release member 98 results in the plunger being pulled toward the right to the fully retracted position of FIG. 5. As this occurs, force is transmitted from the plunger 50 to the stop member 60 to move the stop member against the influence of the biasing spring 86. Once the plunger 50 has been moved to the fully retracted position of FIG. 5 under the influence of force transmitted from the manual release member 98, the interlock button 36 on the handle 34 can be manually actuated to move the force transmitting member 52 to the lowered position illustrated in FIG. 5. The shift lever 10 can then be moved from the park position.

Brake-Shift Lever Interlock Unit—Second Embodiment

Figure 6:
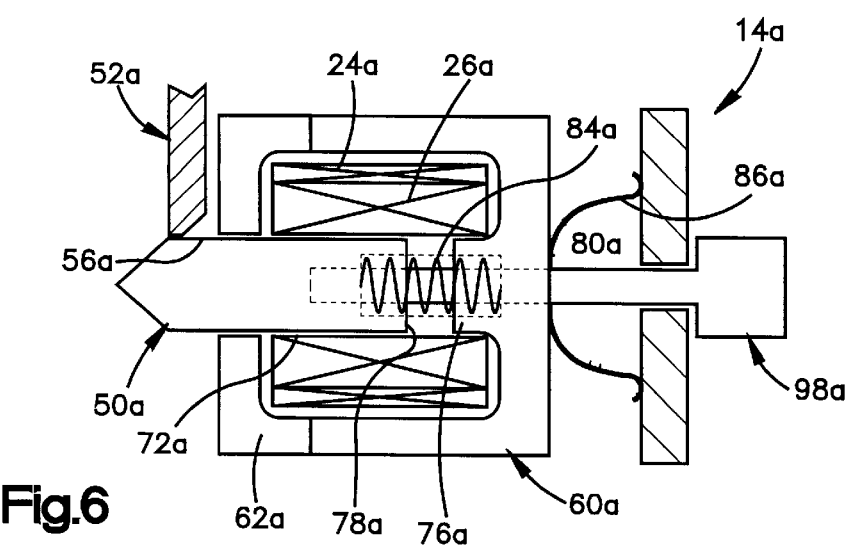
FIG. 6 is a schematic illustration, generally similar to FIG. 3, of a second embodiment of the brake-shift lever interlock unit and illustrating the plunger in an extended position when the vehicle ignition switch and brake switch are in the unactuated condition.
Figure 7:
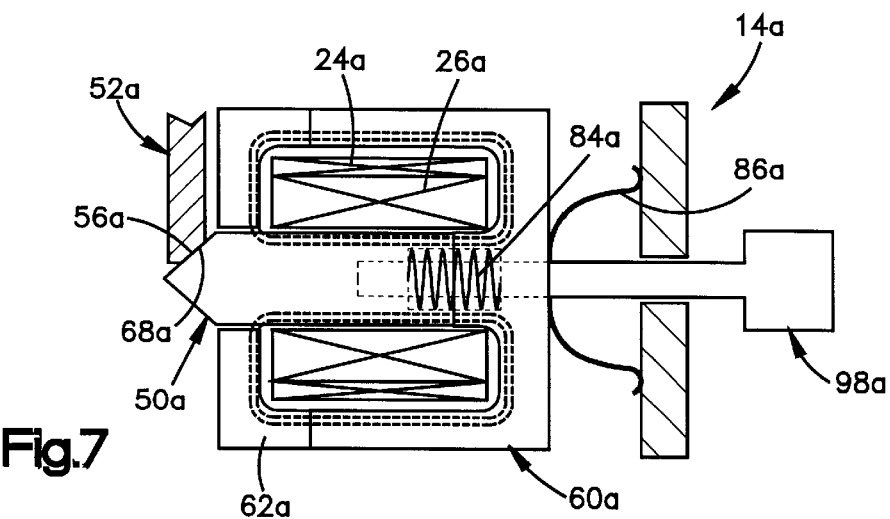
FIG. 7 is a schematic illustration, generally similar to FIG. 6, illustrating the plunger in a partially retracted position when the vehicle ignition switch is in an actuated condition and the vehicle brake switch is in an unactuated condition.
Figure 8:
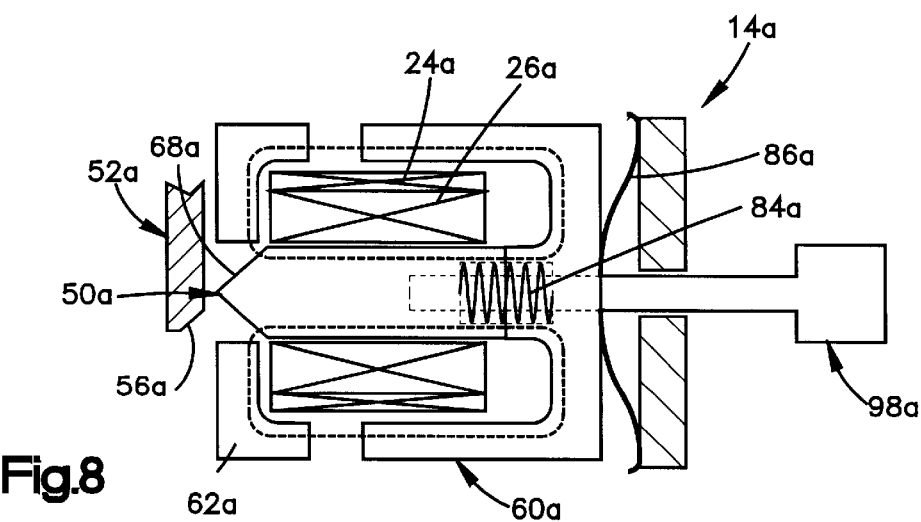
FIG. 8 is a schematic illustration, generally similar to FIGS. 6 and 7, illustrating the plunger in a fully retracted position when both the vehicle ignition switch and vehicle brake switch are in an actuated condition.

In the embodiment of the invention illustrated in FIGS. 1–5, the plunger pull coil 24 and stopper hold coil 26 are disposed in a coaxial relationship and are spaced apart along the path of movement of the plunger 50. In the embodiment of the invention illustrated in FIGS. 6–8, the plunger pull coil and stopper hold coil are also disposed in a coaxial relationship. However, in the embodiment of the invention illustrated in FIGS. 6–8, one of the coils is radially aligned with and extends around the other coil. Since the embodiment of the invention illustrated in FIGS. 6–8 is generally similar to the embodiment of the invention illustrated in FIGS. 3–5, similar numerals will be utilized to identify similar components, the suffix letter "a" being associated with the numerals of FIGS. 6–8 to avoid confusion.

A brake-shift lever interlock 14a includes a plunger pull coil 24a and a stopper hold coil 26a. The plunger pull coil 24a and the stopper hold coil 26a are connected with a vehicle ignition switch and a brake switch in the same manner as is illustrated schematically in FIG. 2.

In accordance with a feature of this embodiment of the invention, the annular plunger pull coil 24a and stopper hold coil 26a are axially aligned with each other. The stopper hold coil 26a is enclosed by the plunger pull coil 24a. Although it is preferred to enclose the stopper hold coil 26a with the plunger pull coil 24a, the plunger pull coil could be enclosed by the stopper hold coil if desired.

A plunger 50a has a longitudinal central axis which is coincident with the central axes of the plunger pull coil 24a and the stopper hold coil 26a. The plunger 50a extends into a cylindrical passage 72a which is formed by the plunger pull coil 24a, stopper hold coil 26a and a base member 62a. A stop member 60a extends around the coaxial coils 24a and 26a (FIG. 6). A biasing spring 86a is effective to press the stop member 60a against the base 62a when the plunger pull coil 24a and stopper hold coil 26a are in a de-energized condition.

Prior to actuation of the vehicle ignition switch to a closed condition, the plunger 50a is urged to the extended position of FIG. 6 by a biasing spring 84a which is disposed between the stop member 60a and the plunger 50a. At this time, a stem portion 76a of the stop member 60a extends into the passage 72a. When the plunger 50a is in the extended position of FIG. 6, a cylindrical side surface 56a on the plunger 50a is aligned with the force transmitting member 52a. Therefore, the plunger 50a blocks downward movement of the force transmitting member 52a and prevents the shift lever, corresponding to the shift lever 10 of FIG. 1, from being moved from its parked position.

When operation of the vehicle is to be undertaken, the ignition switch, corresponding to the ignition switch 18 of FIG. 2, is operated to an actuated condition. Actuating the ignition switch energizes both the plunger pull coil 24a and the stopper hold coil 26a through an unactuated brake switch, corresponding to the brake switch 20 of FIG. 2. When the plunger pull coil 24a and stopper hold coil 26a are both energized (FIG. 7), the magnetic fields from the two coils effect rightward (as viewed in FIGS. 6 and 7) movement of the plunger 50a from the extended position of FIG. 6 to the partially retracted position of FIG. 7.

When the plunger 50a is in the partially retracted position of FIG. 7, a cam surface 68a on the plunger 50a is aligned with a cam surface 56a on a force transmitting member 52a (FIG. 7). At this time, the stop member 60a is pressed firmly against the base 62a under the influence of the magnetic fields emanating from both the plunger pull coil 24a and the stopper hold coil 26a.

An end surface 78a (FIG. 6) on the partially retracted plunger 50a (FIG. 7) is disposed in engagement with an end surface 80a (FIG. 6) on the stem portion 76a of the stop member 60a. The biasing spring 84a (FIG. 7) is compressed between the plunger 50a and stop member 60a. The force transmitting member 52a stops the downward movement (as viewed in FIG. 7) by engagement of the cam surface 56a on the force transmitting member with the cam surface 68a on the plunger 50a. Therefore, the shift lever can not be moved out of the park position prior to actuation of the brake switch by depressing a brake pedal.

When the brake pedal is depressed, a brake switch, corresponding to the brake switch 20 of FIG. 2, is actuated. The stopper hold coil 26a is de-energized as the brake switch is actuated. Upon de-energization of the stopper hold coil 26a, the relatively weak magnetic field from the plunger pull coil 24a, is ineffective to hold the stop member 60a and plunger 50 against rightward (as viewed in FIG. 7) movement under the influence of force applied against the cam surface 68a on the plunger 50 by the cam surface 56a on the force transmitting member 52a.

The force applied against the plunger 50a by the force transmitting member 52a is effective to move the plunger 50a from the partially retracted position of FIG. 7 to the fully retracted position of FIG. 8. As this occurs, the stop member 60a is moved away from the base member 62a against the influence of the biasing spring 86a. The force transmitting member 52a then moves downward past the fully retracted plunger 50a to release the shift lever for movement from the parked position.

CONCLUSION

In view of the foregoing description, it is apparent that the present invention relates to a new and improved brake-shift lever interlock unit 14 which prevents movement of a vehicle shift lever 10 out of a park position prior to activation of both a vehicle ignition switch 18 and a vehicle brake switch 20. The apparatus includes first and second coils 24 and 26 which are connected with a base. The coils 24 and 26 may, advantageously, define a passage 72 which extends through the coils. A plunger 50 may be movable along the passage through the coils.

When a vehicle ignition switch 18 is operated to an actuated condition and a vehicle brake switch 20 is in an unactuated condition, the plunger 50 is moved from an extended position (FIG. 3) to a partially retracted position (FIG. 4) under the influence of a magnetic field 90 provided by the first coil 24. At this time, an end portion of the plunger 50 blocks movement of a force transmitting member 52 connected with the vehicle shift lever 10 to prevent movement of the vehicle shift lever out of a park position.

Upon depressing of a vehicle brake pedal 44, a brake switch 20 is actuated. The plunger 50 may then be released for movement from the partially retracted position (FIG. 4) to a fully retracted position (FIG. 5). As this occurs, force applied against the plunger 50 by the force transmitting member 52 may move the plunger to a fully retracted position. The vehicle shift lever 10 can then be moved from the park position.

In a particularly advantageous one of many possible embodiments of the invention, the plunger 50 has a side portion 56 which extends along the path of movement of the plunger between the extended and fully retracted positions. When the plunger of this particular embodiment of the invention is in the extended position (FIG. 3), the side portion 56 is engaged by and blocks movement of the force transmitting member 52. When the plunger 50 is moved to a partially retracted position (FIG. 4) under the influence of the magnetic field in the first coil 24, a cam surface 68 on an end portion of the plunger 50 is engaged by the force transmitting member 52 and blocks movement of the force transmitting member to prevent movement of the shift lever 10 from the park position. When the vehicle brake switch 20 is actuated, the plunger is released and force applied against the cam surface 68 on the plunger 50 by the force transmitting member 52 is effective to move the plunger to a fully retracted position (FIG. 5) enabling the shift lever 10 to be moved out of the park position.

A stop member 60 may be provided, in the foregoing specific one of many possible embodiments of the invention, to block movement of the plunger 50 from the partially retracted position (FIG. 4) to the fully retracted position (FIG. 5) under the influence of force applied against the cam surface 68 by the force transmitting member 52 when the vehicle brake switch 20 is in the unactuated condition. Upon operation of the vehicle brake switch 20 to the actuated condition, the second coil 26 is de-energized. De-energization of the second coil 26 releases the stop member 60 and enables the plunger 50 to be moved from the partially retracted position (FIG. 4) to the fully retracted position (FIG. 5).

From the above description of the invention, those skilled in the art will perceive improvements, changes and modifications. Such improvements, changes and modifications within the skill of the art are intended to be covered by the appended claims.

Having described the invention, the following is claimed:

1. An apparatus which prevents movement of a vehicle shift lever out of a park position prior to actuation of both a vehicle ignition switch and a vehicle brake switch, said apparatus comprising:

a base fixedly connectable with the vehicle;

first and second coils which are connected with said base and at least partially define a passage extending through said first and second coils, and a plunger which is movable in the passage through said first and second coils from an extended position to a partially retracted position under the influence of a magnetic field provided by at least one of said first and second coils when said first and second coils are energized and the vehicle ignition switch is in an actuated condition and the vehicle brake switch is in an unactuated condition, said plunger being movable in the passage through said first and second coils from the partially retracted position to a fully retracted position under the influence of force applied against said plunger by a force transmitting element connected with the vehicle shift lever when the vehicle ignition switch is in the actuated condition and the vehicle brake switch is in an actuated condition.

2. An apparatus as set forth in claim 1 further including a stop member which blocks movement of said plunger in the passage through said first and second coils when said plunger is in the partially retracted position with the vehicle ignition switch in the actuated condition and the vehicle brake switch in the unactuated condition.

3. An apparatus as set forth in claim 2 wherein at least a portion of said stop member is disposed in the passage through said first and second coils when said plunger is in the partially retracted position with the vehicle ignition switch in the actuated condition and the vehicle brake switch is in the unactuated condition.

4. An apparatus as set forth in claim 2 wherein said plunger is disposed in engagement with said stop member and moves with said stop member relative to said base during at least a portion of movement of said plunger from the partially retracted position to the fully retracted position.

5. An apparatus as set forth in claim 1 wherein said first and second coils are disposed in a coaxial relationship and one of said first and second coils at least partially encloses the other of said first and second coils.

6. An apparatus as set forth in claim 1 wherein said first and second coils are disposed in a coaxial relationship and extend around the passage through said first and second coils at spaced apart locations along the passage.

7. An apparatus as set forth in claim 1 wherein said plunger has a surface which extends transverse to a longitudinal central axis of the passage through said first and second coils and which is engaged by the force transmitting member connected with the vehicle shift lever when said plunger is in the partially retracted position, said surface on said plunger being at least partially disposed in the passage through said first and second coils when said plunger is in the fully retracted position.

8. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils between an extended position, a partially retracted position, and a fully retracted position, said partially retracted position of said plunger being disposed between said extended position of said plunger and said fully retracted position of said plunger;

said plunger having a side portion which extends along a path of movement of said plunger between the extended and fully retracted positions;

said plunger having a cam portion which extends transverse to said side portion of said plunger and extends transverse to the path of movement of said plunger between the extended and fully retracted positions;

said side portion of said plunger being engageable by a force transmitting member connected with the vehicle shift lever to block movement of the vehicle shift lever from the park position when the vehicle ignition and brake switches are in the unactuated condition;

said plunger being moved from the extended position to the partially retracted position under the influence of a magnetic field provided by at least one of said first and second coils when the vehicle ignition switch is operated to the actuated condition with the vehicle brake switch in the unactuated condition;

said cam portion of said plunger being engageable by the force transmitting member connected with the vehicle shift lever to block movement of the vehicle shift lever from the park position when said plunger is in the partially retracted position with the vehicle ignition switch in the actuated condition and the vehicle brake switch in the unactuated condition and with said first and second coils energized to provide magnetic fields;

said plunger being movable from the partially retracted position to the fully retracted position under the influence of force applied against said cam portion of said plunger by the force transmitting member connected with the vehicle shift lever to release the vehicle shift lever for movement from the park position when the vehicle ignition and brake switches are in the actuated condition and said second coil is the de-energized condition.

9. An apparatus as set forth in claim 8 further including a stop member which is held against movement relative to said base by a magnetic field provided by said second coil when the vehicle ignition switch is in the actuated condition and the vehicle brake switch is in the unactuated condition, said stop member being effective to block movement of said plunger from the partially retracted position to the fully retracted position when the vehicle ignition switch is in the actuated condition and the vehicle brake switch is in the unactuated condition, said stop member being movable relative to said base under the influence of force transmitted from said plunger to said stop member during movement of said plunger from the partially retracted position to the fully retracted position when the vehicle ignition and brake switches are in the actuated condition and said second coil is in the de-energized condition.

10. An apparatus as set forth in claim 9 wherein said plunger is disposed in engagement with said stop member and moves with said stop member relative to said base during at least a portion of the movement of said plunger from the partially retracted position to the fully retracted position.

11. An apparatus as set forth in claim 8 wherein said first and second coils are disposed in a coaxial relationship with said plunger extending into at least one of said coils when said plunger is in the fully retracted position.

12. An apparatus as set forth in claim 8 wherein said first and second coils have annular cross sectional configurations, said plunger being at least partially enclosed by said first coil as said plunger moves between the extended, partially retracted, and fully retracted positions.

13. An apparatus as set forth in claim 8 further including a manually engageable member connected with said plunger, said manually engageable member being movable relative to said base to move said plunger between the extended, partially retracted, and fully retracted positions.

14. An apparatus as set forth in claim 8 wherein said first and second coils are disposed in a coaxial relationship and are axially spaced apart along and extend around the path of movement of said plunger between the extended, partially retracted and fully retracted positions.

15. An apparatus as set forth in claim 8 wherein said first and second coils are disposed in a coaxial relationship with one of said first and second coils at least partially enclosing another of said first and second coils.

16. An apparatus as set forth in claim 8 further including a biasing spring which urges said plunger toward the extended position, said plunger and biasing spring being movable together relative to said base during movement of said plunger from the partially retracted position to the fully retracted position.

17. An apparatus as set forth in claim 8 further including surface means for at least partially defining a passage which extends through said first and second coils, said plunger being movable along said passage during movement of said plunger between the extended, partially retracted, and fully retracted positions, and a stop member which blocks movement of said plunger along said passage when said plunger is in the partially retracted position with said second coils in the energized condition.

18. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils between an extended position, a partially retracted position, and a fully retracted position;

said plunger being movable from the extended position to the partially retracted position under the influence of a magnetic field provided by at least one of said first and second coils when the vehicle ignition switch is operated to the actuated condition with the vehicle brake switch in the unactuated condition; and a stop member which is held against movement relative to said base by a magnetic field provided by said second coil when the vehicle ignition switch is in the actuated condition and the vehicle brake switch is in the unactuated condition, said stop member being effective to block movement of said plunger from the partially retracted position to the fully retracted position when the vehicle ignition switch is in the actuated condition and the vehicle brake switch is in the unactuated condition with the shift lever in the park position;

said stop member and said plunger being movable together during at least a portion of movement of said plunger from the partially retracted position to the fully retracted position under the influence of force applied against said plunger by a force transmitting member connected with the vehicle shift lever to release the vehicle shift lever for movement from the park position when the vehicle ignition and brake switches are in the actuated condition and said second coil is in the de-energized condition.

19. An apparatus as set forth in claim 18 wherein said first and second coils are disposed in a coaxial relationship with said plunger extending into at least one of said coils when said plunger is in the fully retracted position.

20. An apparatus as set forth in claim 18 wherein said first and second coils have annular cross sectional configurations, said plunger being at least partially enclosed by said first coil as said plunger moves between the extended, partially retracted, and fully retracted positions.

21. An apparatus as set forth in claim 18 wherein said first and second coils are disposed in a coaxial relationship and are axially spaced apart along and extend around the path of movement of said plunger between the extended, partially retracted and fully retracted positions.

22. An apparatus as set forth in claim 18 wherein said first and second coils are disposed in a coaxial relationship with one of said first and second coils at least partially enclosing another of said first and second coils.

23. An apparatus as set forth in claim 18 further including a biasing spring which urges said plunger toward the extended position, said plunger and biasing spring being movable together with said stop member relative to said base during at least a portion of movement of said plunger from the partially retracted position to the fully retracted position.

24. An apparatus as set forth in claim 18 further including surface means for at least partially defining a passage which extends through said first and second coils, said plunger being movable in said passage during movement of said plunger between the extended, partially retracted, and fully retracted positions, said stop member blocks movement of said plunger in said passage when said plunger is in the partially retracted position with said second coils coil in the energized condition.

25. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils between an extended position, a partially retracted position, and a fully retracted position, said partially retracted position of said plunger being disposed between said extended position of said plunger and said fully retracted position of said plunger;

said plunger having a side portion which extends along a path of movement of said plunger between the extended and fully retracted positions;

said plunger having a cam portion which extends transverse to said side portion of said plunger and extends transverse to the path of movement of said plunger between the extended and fully retracted positions;

said side portion of said plunger being engageable by a force transmitting member connected with the vehicle shift lever to block movement of the vehicle shift lever from the park position when the vehicle ignition and brake switches are in the unactuated condition;

said plunger being moved from the extended position to the partially retracted position under the influence of a magnetic field provided by at least one of said first and second coils when the vehicle ignition switch is operated to the actuated condition with the vehicle brake switch in the unactuated condition;

said cam portion of said plunger being engageable by the force transmitting member connected with the vehicle shift lever to block movement of the vehicle shift lever from the park position when said plunger is in the partially retracted position with the vehicle ignition switch in the actuated condition and the vehicle brake switch in the unactuated condition and with said first and second coils energized to provide magnetic fields;

said plunger being movable from the partially retracted position to the fully retracted position under the influence of force applied against said cam portion of said plunger by the force transmitting member connected with the vehicle shift lever to release the vehicle shift lever for movement from the park position when the vehicle ignition and brake switches are in the actuated condition and said second coil is the de-energized condition;

a stop member which is held against movement relative to said base by a magnetic field provided by said second coil when the vehicle ignition switch is in the actuated condition and the vehicle brake switch is in the unactuated condition, said stop member being effective to block movement of said plunger from the partially retracted position to the fully retracted position when the vehicle ignition switch is in the actuated condition and the vehicle brake switch is in the unactuated condition, said stop member being movable relative to said base under the influence of force transmitted from said plunger to said stop member during movement of said plunger from the partially retracted position to the fully retracted position when the vehicle ignition and brake switches are in the actuated condition and said second coil is in the de-energized condition;

said plunger is disposed in engagement with said stop member and moves with said stop member relative to said base during at least a portion of the movement of said plunger from the partially retracted position to the fully retracted position;

said first and second coils are disposed in a coaxial relationship with said plunger extending into at least one of said coils when said plunger is in the fully retracted position;

said plunger being at least partially enclosed by said first coil as said plunger moves between the extended, partially retracted, and fully retracted positions; and a biasing spring which urges said plunger toward the extended position, said plunger and biasing spring being movable together relative to said base during movement of said plunger from the partially retracted position to the fully retracted position.

26. An apparatus which prevents movement of a vehicle shift lever out of a park position prior to actuation of both a vehicle ignition switch and a vehicle brake switch, said apparatus comprising:

a base fixedly connectable with the vehicle;

first and second coils which are connected with said base and at least partially define a passage extending through said first and second coils; and a plunger which is movable along the passage through said first and second coils from an extended position to a partially retracted position under the influence of a magnetic field provided by at least one of said first and second coils when said first and second coils are energized and the vehicle ignition switch is in an actuated condition and the vehicle brake switch is in an unactuated condition, said plunger being movable along the passage through said first and second coils from the partially retracted position to a fully retracted position under the influence of force applied against said plunger by a force transmitting element connected with the vehicle shift lever when the vehicle ignition switch is in the actuated condition and the vehicle brake switch is in an actuated condition; and a manually engageable member connected with said plunger, said manually engageable member being movable relative to said base to move said plunger along the passage through said first and second coils.

27. An apparatus which prevents movement of a vehicle shift lever out of a park position prior to actuation of both a vehicle ignition switch and a vehicle brake switch, said apparatus comprising:

a base fixedly connectable with the vehicle;

first and second coils which are connected with said base and at least partially define a passage extending through said first and second coils; and a plunger which is movable along the passage through said first and second coils from an extended position to a partially retracted position under the influence of a magnetic field provided by at least one of said first and second coils when said first and second coils are energized and the vehicle ignition switch is in an actuated condition and the vehicle brake switch is in an unactuated condition, said plunger being movable along the passage through said first and second coils from the partially retracted position to a fully retracted position under the influence of force applied against said plunger by a force transmitting element connected with the vehicle shift lever when the vehicle ignition switch is in the actuated condition and the vehicle brake switch is in an actuated condition; and a biasing spring disposed in the passage through said first and second coils, said biasing spring being effective to urge said plunger toward the extended position.

28. An apparatus as set forth in claim 27 wherein said biasing spring and said plunger are movable together along the passage through the first and second coils during movement of said plunger from the partially retracted position to the fully retracted position.

29. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils between an extended position, a partially retracted position, and a fully retracted position;

said plunger being movable from the extended position to the partially retracted position under the influence of a magnetic field provided by at least one of said first and second coils when the vehicle ignition switch is operated to the actuated condition with the vehicle brake switch in the unactuated condition;

a stop member which is held against movement relative to said base by a magnetic field provided by said second coil when the vehicle ignition switch is in the actuated condition and the vehicle brake switch is in the unactuated condition, said stop member being effective to block movement of said plunger from the partially retracted position to the fully retracted position when the vehicle ignition switch is in the actuated condition and the vehicle brake switch is in the unactuated condition with the shift lever in the park position;

said stop member and said plunger being movable together during at least a portion of movement of said plunger from the partially retracted position to the fully retracted position under the influence of force applied against said plunger by a force transmitting member connected with the vehicle shift lever to release the vehicle shift lever for movement from the park position when the vehicle ignition and brake switches are in the actuated condition and said second coil is in the de-energized condition; and a manually engageable member connected with said plunger, said manually engageable member being movable relative to said base to move said plunger between the extended, partially retracted, and fully retracted positions.

30. An apparatus as set forth in claim 29 wherein said first and second coils are disposed in a coaxial relationship with said plunger extending into at least one of said coils when said plunger is in the fully retracted position.

31. An apparatus as set forth in claim 29 wherein said first and second coils have annular cross sectional configurations, said plunger being at least partially enclosed by said first coil as said plunger moves between the extended, partially retracted, and fully retracted positions.

32. An apparatus as set forth in claim 29 wherein said first and second coils are disposed in a coaxial relationship and are axially spaced apart along and extend around the path of movement of said plunger between the extended, partially retracted and fully retracted positions.

33. An apparatus as set forth in claim 29 wherein said first and second coils are disposed in a coaxial relationship with one of said first and second coils at least partially enclosing another of said first and second coils.

34. An apparatus as set forth in claim 29 further including a biasing spring which urges said plunger toward the extended position, said plunger and biasing spring being movable together with said stop member relative to said base during at least a portion of movement of said plunger from the partially retracted position to the fully retracted position.

35. An apparatus as set forth in claim 29 further including surface means for at least partially defining a passage which extends through said first and second coils, said plunger being movable along said passage during movement of said plunger between the extended, partially retracted, and fully retracted positions, said stop member blocks movement of said plunger along said passage when said plunger is in the partially retracted position with said second coil in the energized condition.

36. An apparatus as set forth in claim 29 further including a biasing spring disposed between said stop member and said plunger to urge said plunger toward the extended position.

37. An apparatus as set forth in claim 29 further including a biasing spring which provides force to urge said stop member toward said base, said biasing spring being compressed under the influence of force transmitted from said plunger through said stop member to said biasing spring during movement of said plunger from the partially retracted position to the fully retracted position.

38. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils between an extended position, a partially retracted position, and a fully retracted position;

said plunger being movable from the extended position to the partially retracted position under the influence of a magnetic field provided by at least one of said first and second coils when the vehicle ignition switch is operated to the actuated condition with the vehicle brake switch in the unactuated condition;

a stop member which is held against movement relative to said base by a magnetic field provided by said second coil when the vehicle ignition switch is in the actuated condition and the vehicle brake switch is in the unactuated condition, said stop member being effective to block movement of said plunger from the partially retracted position to the fully retracted position when the vehicle ignition switch is in the actuated condition and the vehicle brake switch is in the unactuated condition with the shift lever in the park position;

said stop member and said plunger being movable together during at least a portion of movement of said plunger from the partially retracted position to the fully retracted position under the influence of force applied against said plunger by a force transmitting member connected with the vehicle shift lever to release the vehicle shift lever for movement from the park position when the vehicle ignition and brake switches are in the actuated condition and said second coil is in the de-energized condition; and a biasing spring disposed between said stop member and said plunger to urge said plunger toward the extended position.

39. An apparatus as set forth in claim 38 wherein said first and second coils are disposed in a coaxial relationship with said plunger extending into at least one of said coils when said plunger is in the fully retracted position.

40. An apparatus as set forth in claim 38 wherein said first and second coils have annular cross section configurations, said plunger being at least partially enclosed by said first coil as said plunger moves between the extended, partially retracted, and fully retracted positions.

41. An apparatus as set forth in claim 38 further including a manually engageable member connected with said plunger, said manually engageable member being movable relative to said base to move said plunger between the extended, partially retracted, and fully retracted positions.

42. An apparatus as set forth in claim 38 wherein said first and second coils are disposed in a coaxial relationship and are axially spaced apart along and extend around the path of movement of said plunger between the extended, partially retracted and fully retracted positions.

43. An apparatus as set forth in claim 38 wherein said first and second coils are disposed in a coaxial relationship with one of said first and second coils at least partially enclosing another of said first and second coils.

44. An apparatus as set forth in claim 38 wherein said plunger and biasing spring are movable together with said stop member relative to said base during at least a portion of movement of said plunger from the partially retracted position to the fully retracted position.

45. An apparatus as set forth in claim 38 further including surface means for at least partially defining a passage which extends through said first and second coils, said plunger being movable along said passage during movement of said plunger between the extended, partially retracted, and fully retracted positions, said stop member blocks movement of said plunger along said passage when said plunger is in the partially retracted position with said second coil in the energized condition.

46. An apparatus as set forth in claim 38 further including a second biasing spring which provides force to urge said stop member toward said base, said second biasing spring being compressed under the influence of force transmitted from said plunger through said stop member to said biasing spring during movement of said plunger relative to said first and second coils.

47. An apparatus which prevents movement of a vehicle shift lever out of a park position prior to actuation of both a vehicle ignition switch and a vehicle brake switch, said apparatus comprising:

a base fixedly connectable with the vehicle;

first and second coils connected with said base, said first and second coils being in an electrically energized condition to provide magnetic fields after operation of the vehicle ignition switch from an unactuated condition to an actuated condition with the vehicle brake switch in an unactuated condition and with the vehicle shift lever in the park position, said second coil being in a de-energized condition after operation of the vehicle brake switch to an actuated condition with the vehicle ignition switch in the actuated condition;

a plunger which is disposed adjacent to said first and second coils and is movable relative to said first and second coils;

said plunger being movable relative to said first and second coils under the influence of a magnetic field provided by at least one of said first and second coils when the vehicle ignition switch is operated to the actuated condition with the vehicle brake switch in the unactuated condition;

a stop member which is held against movement relative to said base by a magnetic field provided by said second coil when the vehicle ignition switch is in the actuated condition and the vehicle brake switch is in the unactuated condition, said stop member being effective to block movement of said plunger when the vehicle ignition switch is in the actuated condition and the vehicle brake switch is in the unactuated condition with the shift lever in the park position; and a biasing spring which provides force to urge said stop member toward said base, said biasing spring compressed under the influence of force transmitted from said plunger through said stop member to said biasing spring during movement of said plunger relative to said first and second coils.

48. An apparatus as set forth in claim 47 wherein said stop member and plunger are movable together under the influence of force applied against said plunger by the force transmitting member connected with the vehicle shift lever to compress said biasing spring and release the vehicle shift lever for movement from the park position when the vehicle ignition and brake switches are in the actuated condition and said second coil is in the de-energized condition.

49. An apparatus as set forth in claim 47 wherein said first and second coils are disposed in a coaxial relationship with said plunger extending into a passage which extends through said first and second coils.

50. An apparatus as set forth in claim 47 wherein said first and second coils have annular cross sectional configuration, said plunger being at least partially enclosed by said first coil and said stop member being at least partially enclosed by said second coil as said biasing spring is compressed by force transmitted from said plunger through said stop member.

51. An apparatus as set forth in claim 47 further including a manually engageable member connected with said plunger and said stop member, said manually engageable member being movable relative to said base to move said plunger and stop member relative to said base.

52. An apparatus as set forth in claim 47 wherein said first and second coils are disposed in a coaxial relationship and are axially spaced apart along and extend around a path of movement of said plunger relative to said first and second coils.

53. An apparatus as set forth in claim 47 wherein said first and second coils are disposed in a coaxial relationship with one of said first and second coils at least partially enclosing another of said first and second coils.

54. An apparatus as set forth in claim 47 further including surface means for at least partially defining a passage which extends through said first and second coils, said plunger being movable in said passage during movement of said plunger relative to said first and second coils, said stop member blocks movement of said plunger in said passage when said second coil is in the energized condition.

55. An apparatus as set forth in claim 47 further including a second biasing spring disposed between said stop member and said plunger to urge said plunger in a direction away from said stop member.

\* \* \* \* \*